(12) United States Patent
Extrand et al.

(10) Patent No.: US 6,923,216 B2
(45) Date of Patent: Aug. 2, 2005

(54) MICROFLUIDIC DEVICE WITH ULTRAPHOBIC SURFACES

(75) Inventors: Charles W. Extrand, Minneapolis, MN (US); Michael Wright, Greenwood, MN (US)

(73) Assignee: Entegris, Inc., Chaska, MN (US)

( * ) Notice: Subject to any disclaimer, the term of this patent is extended or adjusted under 35 U.S.C. 154(b) by 30 days.

(21) Appl. No.: 10/652,586

(22) Filed: Aug. 29, 2003

(65) Prior Publication Data

US 2004/0209047 A1 Oct. 21, 2004

Related U.S. Application Data

(60) Provisional application No. 60/462,963, filed on Apr. 15, 2003.

(51) Int. Cl.$^7$ ................................................. F15D 1/02
(52) U.S. Cl. .......................................... 138/39; 138/38
(58) Field of Search ..................... 138/38, 39; 244/126, 244/130; 144/67 R

(56) References Cited

U.S. PATENT DOCUMENTS

| | | | | |
|---|---|---|---|---|
| 4,044,797 A | * | 8/1977 | Fujie et al. | .................. 138/38 |
| 4,750,693 A | * | 6/1988 | Lobert et al. | ................ 244/200 |
| 5,052,476 A | * | 10/1991 | Sukumoda et al. | ......... 165/133 |
| 5,070,937 A | * | 12/1991 | Mougin et al. | ............. 165/133 |
| 5,252,835 A | | 10/1993 | Lieber et al. | |
| 5,609,907 A | | 3/1997 | Natan | |
| 5,679,460 A | | 10/1997 | Schakenraad et al. | |
| 5,725,788 A | | 3/1998 | Maracas et al. | |
| 5,900,160 A | | 5/1999 | Whitesides et al. | |
| 5,971,326 A | * | 10/1999 | Bechert | ........................ 244/200 |
| 6,193,191 B1 | * | 2/2001 | Falcimaigne et al. | ........ 244/130 |
| 6,312,303 B1 | | 11/2001 | Yaniv et al. | |
| 6,371,414 B1 | * | 4/2002 | Truax et al. | ................. 244/201 |
| 6,403,388 B1 | | 6/2002 | Birdsley et al. | |
| 6,423,372 B1 | | 7/2002 | Genzer et al. | |
| 6,432,866 B1 | | 8/2002 | Tennent et al. | |
| 6,444,254 B1 | | 9/2002 | Chilkoti et al. | |
| 6,455,021 B1 | | 9/2002 | Saito | |

(Continued)

FOREIGN PATENT DOCUMENTS

| | | |
|---|---|---|
| WO | WO 00/38845 | 7/2000 |
| WO | WO 00/39368 | 7/2000 |
| WO | WO 01/79142 A1 | 10/2001 |
| WO | WO 01/92179 A1 | 12/2001 |
| WO | WO 01/94034 A1 | 12/2001 |
| WO | WO 02/084340 A1 | 10/2002 |

OTHER PUBLICATIONS

Didem Öner et al., *Ultrahydrophobic Surfaces, Effects of Topography Length Scales on Wettability*, Langmuir 2000, Jun. 23, 2000, vol. 16, No. 20, pp. 7777–7782.

Robert H. Dettre et al., *Contact Angle Hysteresis II. Contact Angle Measurements on Rough Surfaces*, Advances in Chemistry Series, Mar. 22, 1963, pp. 136–144.

A.B.D. Cassie et al., *Wettability of Porous Surfaces*, Jun. 19, 1944, pp. 546–551.

(Continued)

*Primary Examiner*—James Hook
(74) *Attorney, Agent, or Firm*—Patterson, Thuente, Skaar & Christensen, P.A.

(57) ABSTRACT

A microfluidic device having durable ultraphobic fluid contact surfaces in the fluid flow channels of the device. The ultraphobic surface generally includes a substrate portion with a multiplicity of projecting regularly shaped microscale or nanoscale asperities disposed in a regular array so that the surface has a predetermined contact line density equal to or greater than a critical contact line density, and so that the ratio of the cross-sectional dimension of the asperities to the spacing dimension of the asperities is less than or equal to 0.1.

26 Claims, 11 Drawing Sheets

U.S. PATENT DOCUMENTS

| | | | |
|---|---|---|---|
| 6,518,168 B1 | 2/2003 | Clem et al. | |
| 6,530,554 B2 | 3/2003 | Shimmo et al. | |
| 6,541,389 B1 | 4/2003 | Kubo et al. | |
| 6,655,451 B2 * | 12/2003 | Tada et al. | 165/179 |
| 2002/0025374 A1 | 2/2002 | Lee et al. | |
| 2002/0034879 A1 | 3/2002 | Yun et al. | |
| 2002/0114949 A1 | 8/2002 | Bower et al. | |
| 2002/0122765 A1 | 9/2002 | Horiuchi et al. | |
| 2002/0136683 A1 | 9/2002 | Smalley et al. | |
| 2002/0150684 A1 | 10/2002 | Jayatissa | |
| 2003/0047822 A1 | 3/2003 | Hori et al. | |
| 2004/0081760 A1 * | 4/2004 | Burns et al. | 427/269 |

OTHER PUBLICATIONS

C. Rascón et al., *Geometry–dominated fluid adsorption on sculpted solid substrates*, Nature, Oct. 26, 2000, vol. 407, pp. 986–989.

R.G. Cox, *The spreading of a liquid on a rough surface*, J. Fluid Mech., 1983, vol. 131, pp. 1–26.

G. Michale et al., *Analysis of Shape Distortions in Sessile Drops*, Langmuir, 2001, vol. 17, pp. 6995–6998.

A. Esztermann et al., *Triple–Point Wetting on Rough Substrates*, The American Physical Society, Feb. 4, 2002, vol. 88, No. 5, pp. 55702/1–55702/4.

S.G. Mason, *Wetting and Spreading—Some Effects of Surface Roughness*, Academic Press, 1978, pp. 321–326.

H. Kamusewitz et al., *The relation between Young's equilibrium contact angle and the hysteresis on rough paraffin was surfaces*, Elsevier Science B.V., 1999, pp. 271–279.

J.F. Oliver et al., *Liquid spreading on rough metal surfaces*, Journal of Materials Science, 1980, vol. 15, pp. 431–437.

James E. Smay et al., *Colloidal Inks for Directed Assembly of 3–D Periodic Structures*, Langmuir, 2002, vol. 18, pp. 5429–5437.

Darron E. Hill et al., *Functionalization of Carbon Nanotubes with Polystyrene*, Macromolecules, 2002, vol. 35, pp. 9466–9471.

Robert J. Good, *A Thermodynamic Derivation of Wenzel's Modification of Young's Equation for Contact Angles: Together with a Theory of Hysteresis*, Journal of American Chemical Society, Oct. 20, 1952, vol. 74, pp. 5041–5042.

Erdal Bayramli et al., *Tensiometric studies on wetting. I. Some effects of surface roughness (theoretical)*, Canadian Journal of Chemistry, 1981, vol. 59, pp. 1954–1961.

S. Semal et al., *Influence of Surface Roughness on Wetting Dynamics*, Langmuir, 1999, vol. 15, pp. 8765–8770.

J.F. Oliver et al., *The Apparent Contact Angle of Liquids on Finely–Grooved Solid Surfaces–A SEM Study*, Gordon and Breach Science Publishers Ltd., 1977, vol. 8, pp. 223–234.

A.J.G. Allan et al., *Wettability of Perfluorocarbon Polymer Films: Effect of Roughness*, Journals of Polymer Science, 1959, vol. XXXIX, pp. 1–8.

J.B. Sweeney et al., *Equilibrium Thin Films on Rough Surfaces. 1. Capillary and Disjoining Effects*, Langmuir, 1993, vol. 9, pp. 1551–1555.

Wei Chen et al., *Ultrahydrophobic and Ultralyophobic Surfaces: Some Comments and Examples*, Langmuir, 1999, vol. 15, pp. 3395–3399.

Jeffrey P. Youngblood et al., *Ultrahyrophobic Polymer Surfaces Prepared by Simultaneous Ablation of Polypropylene and Sputtering of Poly(tetrafluoroethylene) Using Radio Frequency Plasma*, Macromolecules, 1999, vol. 32, pp. 6800–6806.

Joanna Aizenberg et al., *Direct Fabrication of Large Micropatterned Single Crystals*, SCIENCE, vol. 299, Feb. 21, 2003, pp. 1205–1208.

J.D. Eick et al., *Thermodynamics of Contact Angles*, Journal of Colloid and Interface Science, Nov. 1975, vol. 53, No. 2, pp. 235–248.

F.Y.H. Lin et al., *Effects of Surface Roughness on the Dependence of Contact Angles on Drop Size*, Journal of Colloid and Interface Science, 1993, vol. 159, pp. 86–95.

Peter S. Swain et al., *Contact Angles on Heterogeneous Surfaces: A New Look at Cassie's and Wenzel's Laws*, Langmuir, 1998, vol. 14, pp. 6772–6780.

Kiyoharu Tadanaga et al., *Formation Process of Super–Water–Repellent $Al_2O_3$ Coating Films with High Transparency by the Sol–Gel Method*, Communications of the American Ceramic Society, 1997, vol. 80, No. 12, pp. 3213–3216.

Kiyoharu Tadanaga et al., *Super–Water–Repellent $Al_2O_3$ Coating Films with High Transparency*, Communications of the American Ceramic Society, 1997, vol. 80, No. 4, pp. 1040–1042.

Shuhong Li et al., *Super–Hydrophobicity of Large–Area Honeycomb–Like Aligned Carbon Nanotubes*, Journal of Physical Chemistry, 2002, vol. 106, No. 36, pp. 9274–9276.

J. Kijlstra et al., *Roughness and topology of ultra–hydrophobic surfaces*, Elsevier Science B.V., 2002, vol. 206, pp. 521–529.

Masahide Taniguchi et al., *Effect of Undulations on Surface Energy: A Quantitive Assessment*, Langmuir, 2001, vol. 17, pp. 4312–4315.

David Quéré, *Surface Chemistry Fakir droplets*, News & Views, 2002, pp. 14–15.

Masahide Taniguchi et al., *Correcting for Surface Roughness: Advancing and Receding Contact Angles*, Langmuir, 2002, vol. 18, pp. 6465–6467.

M. Thieme et al., *Generation of Ultrahydrophobic Properties of Aluminuim—A First Step to Self–cleaning Transparently Coated Metal Surfaces*, Advanced Engin. Mater., Internet, 2001, vol. 9, pp. 1.

Zen Yoshimitsu et al., *Effects of Surface Structure on the Hydrophobicity and Sliding Behavior of Water Droplets*, Langmuir, 2002, vol. 18, 5818–5822.

David S. Soane et al., *Fluorsight*, Brennan Research Group, Jan. 2003, p. 15.

J.J. Bikerman, *Sliding of Drops From Surfaces of Different Roughness*, pp. 349–359; Mar. 1950.

A.B.D. Cassie, *Contact Angles*, Wool Industries Research Association, Jan. 27, 1948, pp. 11–16.

Eun Hee Cirlin et al., *Roughness and Anisotropy Effects on wettability of Polytetrafluoreothylene and Sodium–treated Polytetrafluoroethylene*, Journal of Polymer Science, 1973, vol. 11, pp. 785–799.

Pulp and Paper Research Institute of Canada, *Liquid Spreading: Edge Effect for Zero Contact Angle*, Journal of Colloid and Interface Science, Aug. 1978, vol. 66, No. 1, pp. 200–202.

Robert N. Wenzel, *Resistance of Solid Surfaces to Wetting by Water*, Industrial and Engineering Chemistry, Aug. 1936, vol. 28, No. 8, pp. 988–994.

Will H. Coghill et al., *Why Water Over–Fills a Tumbler*, Scientific American Supplement, Jul. 27, 1918, vol. 86, No. 2221, pp. 52–53.

R.D. Schulze et al., *Young's equilibrium contact angle on rough solid surface. Part I. An empirical determination*, J. Adhesion Sci. Technol., 1989, vol. 3, No. 1, pp. 39–48.

J.F. Oliver et al., *An Experimental Study of Some Effects of Solid Surface Roughness on Wetting, Colloids and Surfaces*, 1980, vol. 1, pp. 79–104.

Kiyoharu Tadanaga et al., *Superhydrophobic–Superhydrophilic Micropatterning on Flowerlike Alumina Coating Film by the Sol–Gel Method, American Chemical Society*, 2000, vol. 12, pp. 590–592.

S. Herminghaus, *Roughness–induces non–wetting, Europhysics Letters*, Oct. 15, 2000, vol. 52, pp. 165–170.

J. Bico et al., *Rough wetting, Europhysics Letters*, Jul. 15, 2001 vol. 55, pp. 214–220.

Randy Doyle Hazlett, *Fractal Applications: Wettability and Contact Angle, Journal of Colloid and Interface Science*, Jul. 1990, vol. 137, No. 2, 527–533.

Y. Tamai et al., *Experimental Study of the Relation between Contact Angle and Surface Roughness, The Journal of Physical Chemistry*, 1972, vol. 76, No. 22, pp. 3267–3271.

J. Kijlstra et al., *Roughness and topology of ultra–hydrophobic surfaces, Colloids and Surfaces*, 2002, vol. 206, pp. 521–529.

Satoshi Shibuichi et al., *Super Water–Repellent Surfaces Resulting from Fractal Structure, J. Phys. Chem.*, 1996, vol. 100, pp. 19512–19517.

J. Bico et al., *Pearl drops, Europhysics Letters*, Jul. 15, 1999, vol. 47, No. 2, pp. 220–226.

H. Yildirim Erbil et al., *Transformation of a Simple Plastic into a Superhydrophobic Surface, Science*, Feb. 28, 2002, vol. 299, pp. 1377–1380.

J.D. Miller et al., *Effect of Roughness as Determined by Atomic Force Microscopy on the Wetting Properties of PTFE Thin Films\*, Polymer Engineering and Science*, Jul. 1996, vol. 36, No. 14, pp. 1849–1855.

Atsushi Hozumi et al., *Preparation of ultra water–repellent films by microwave plasma–enchanced CVD, Thin Solid Films*, 1997, pp. 222–225.

Brian D. Reiss et al., *DNA–Directed Assembly of Anisotropic Nanopaticles on Lithographically Defined Surfaces and in Solution, Materials Reseach Society*, 2001, vol. 635, pp.C6.2.1–C6.2.6.

F.E. Bartell et al., *Surface Roughness as Related to Hysteresis of Contact Angles. I. The System Paraffin–Water–Air*, J. Phys. Chem., Feb. 1953, vol. 57, pp. 211–215.

F.E. Bartell et al., *Surace Roughness as Related to Hysteresis of Contact Angles. II. The Systems Paraffin–3 Molar Calcium Chloride Solution–Air an Paraffin Glycerol–Air. J. Phys. Chem.*, Apr. 1953, vol. 57, pp. 455–463.

D. Richard et al., *Bouncing water drops, Europhysics letters*, Jun. 15, 2000, vol. 50, pp. 769–775.

Jun Yang et al., *Microfluid Flow in Circular Microchannel with Electrokinetic Effect and Navier's Slip Condition, Langmuir*, 2003, vol. 19, No. 4, pp. 1047–1053.

Neelesh A. Patankar, *On the Modeling of Hydrophobic Contact Angles on Rough Surfaces, Langmuir*, 2003, vol. 19, No. 4, pp. 1249–1253.

Suguru Okuyama et al., *Periodic Submicrocylinder Diamond Surfaces Using Two–Dimensional Fine Particle Arrays, Langmuir*, 2002, vol. 18, No. 22, pp. 8282–8287.

Yoshihito Kunugi et al., *Electro–organic reactions on organic electrodes., J. Electroanal. Chem.*, 1993, vol. 353, pp. 209–215.

C. Huh et al., *Effects of Surface Roughness on Wetting (Theoretical), Journal of Colloid and Interface Science*, Jun. 1, 1977, vol. 60, No. 1, pp. 11–38.

Letter to the Editors, *Contact Angles by Scanning Electron Microscopy. Silicone Oil on Polished Aluminum, Journal of Colloid and Interface Science*, Feb. 1971, vol. 35, No. 2, pp. 362–364.

Norman R. Morrow, *The Effects of Surface Roughness on Contact Angle with Special Reference to Petroleum Recovery, The Journal of Canadian Petroleum*, Oct.–Dec. 1975, pp. 42–54.

Pascale Aussillous et al., *Liquid Marbles, Nature*, Jun. 21, 2001, vol. 411, pp. 924–896.

Wei Jin et al., *Wetting Hysteresis at the Molecular Scale, Physical Review Letters*, Feb. 24, 1997, vol. 78, No. 8, pp. 1520–1523.

H.J. Busscher et al., *The Effect of Surface Roughening of Polymers on Meaured Contact Angles of Liquids, Colloids and Surfaces*, 1984, pp. 319–331.

R. Shuttleworth et al., *The Spreading of a Liquid Over a Rough Solid*, Feb. 23, 1948, pp. 16–22.

J.F. Oliver et al., *Resistance to Spreading of Liquids by Sharp Edges*, Journal of Colloid and Interface Science, May 1977, vol. 59, No. 3, pp. 568–581.

T. Onda et al., *Super–Water–Repellent Fractal Surfaces, The ACS Journal of Surfaces and Colloids*, May 1, 1996, vol. 12, No. 9, pp. 2125–2127.

Phillip G. Wapner et al., *Partial Wetting Phenomena on Nonplanar Surfaces and in Shaped Microchannels, Langmuir*, 2002, vol. 18, No. 4, pp. 1225–1230.

Joonwon Kim et al., *Nanostructured Surfaces for Dramatic Reduction of Flow Resistance in Droplet–Based Microfluidics*, 2002, pp. 479–482.

\* cited by examiner

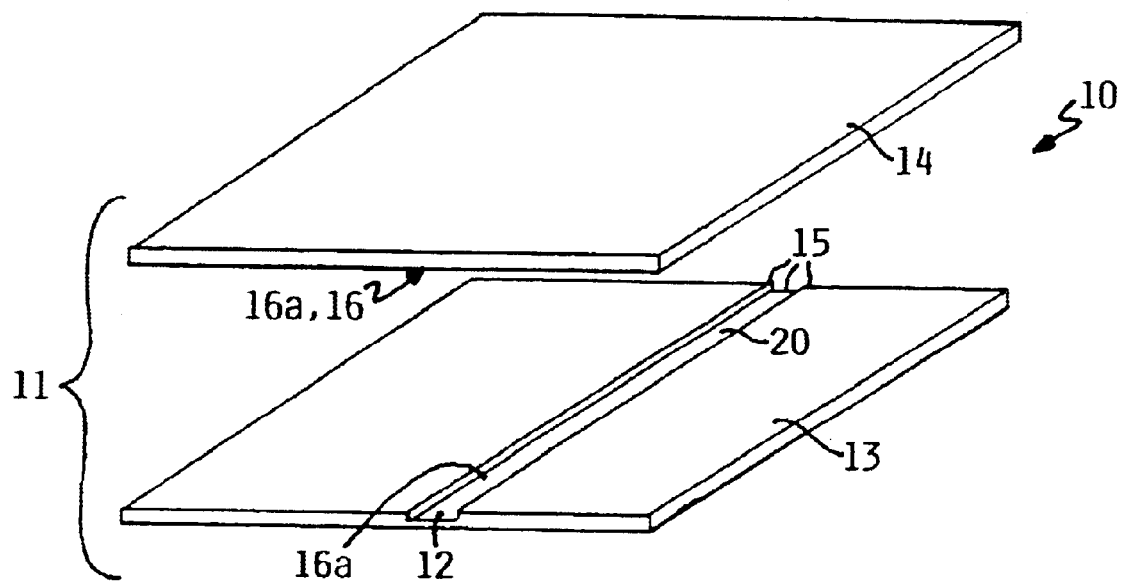
FIG. IB
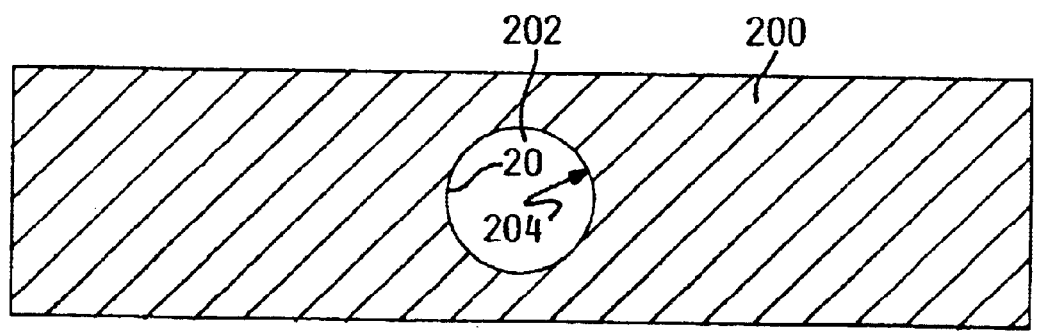
FIG. IC

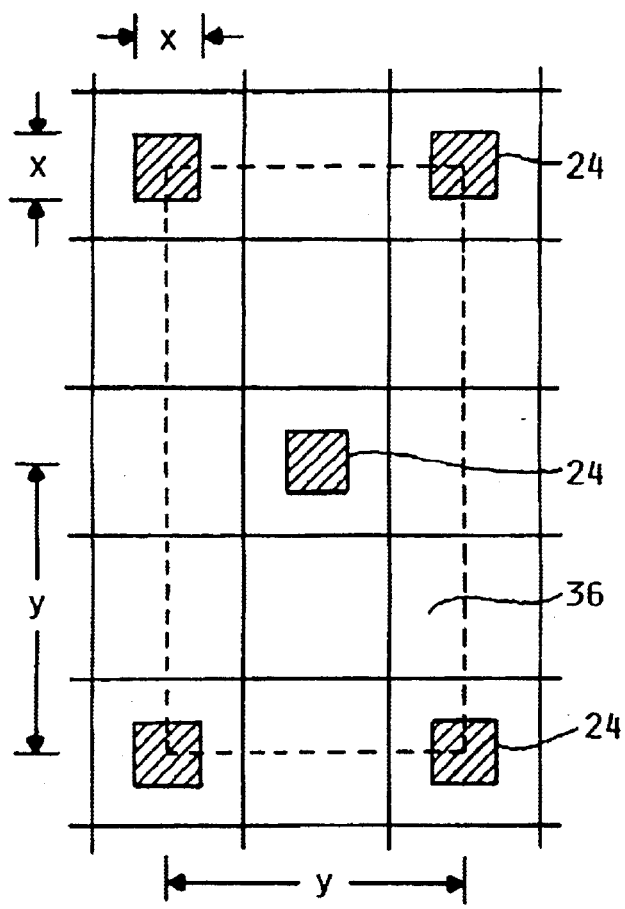
FIG. 4
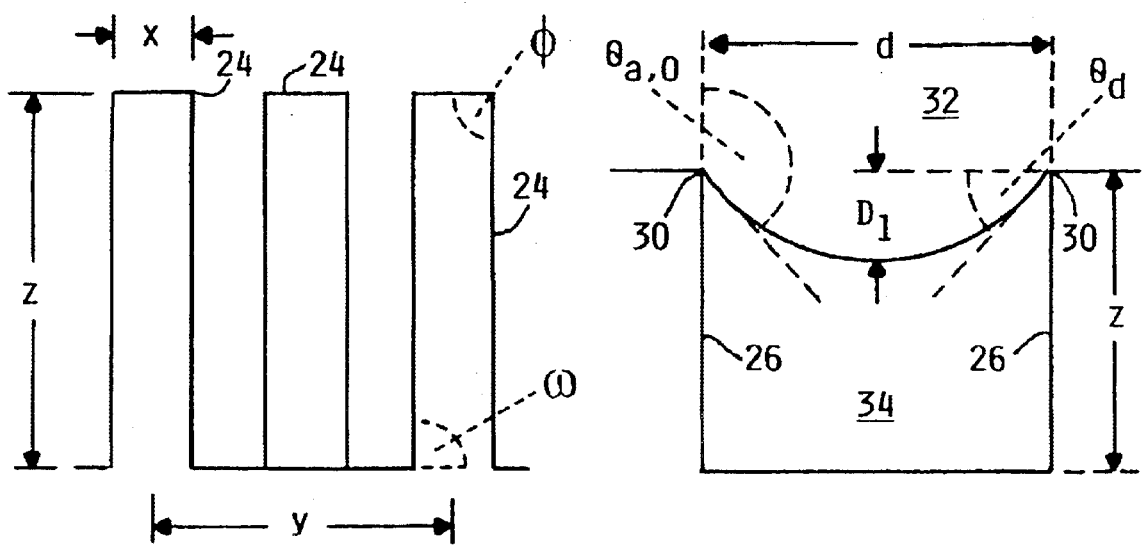
FIG. 5
FIG. 6

| Contact Line Density ($\Lambda$) and Linear Fraction of Contact Along Asperities ($\lambda_p$) | | |
|---|---|---|
| Geometry | $\Lambda$ | $\lambda_p$ |
| Hexagonal Array of Square Posts | $\dfrac{4x}{y^2}$ | $\dfrac{(x/y)}{\{[5/4-2(x/y)+(x/y)^2]^{1/2}+x/y\}}$ |
| Rectangular Array of Square Posts | $\dfrac{4x}{y^2}$ | $\dfrac{x}{y}$ |
| Rectangular Array of Cylindrical Posts | $\dfrac{\pi x}{y^2}$ | $(1-x/y)[1+(1/2\pi-1)(x/y)]$ |
| Parallel Ridges | $\dfrac{2}{y}$ | $\dfrac{x}{y}$ |

FIG. 13

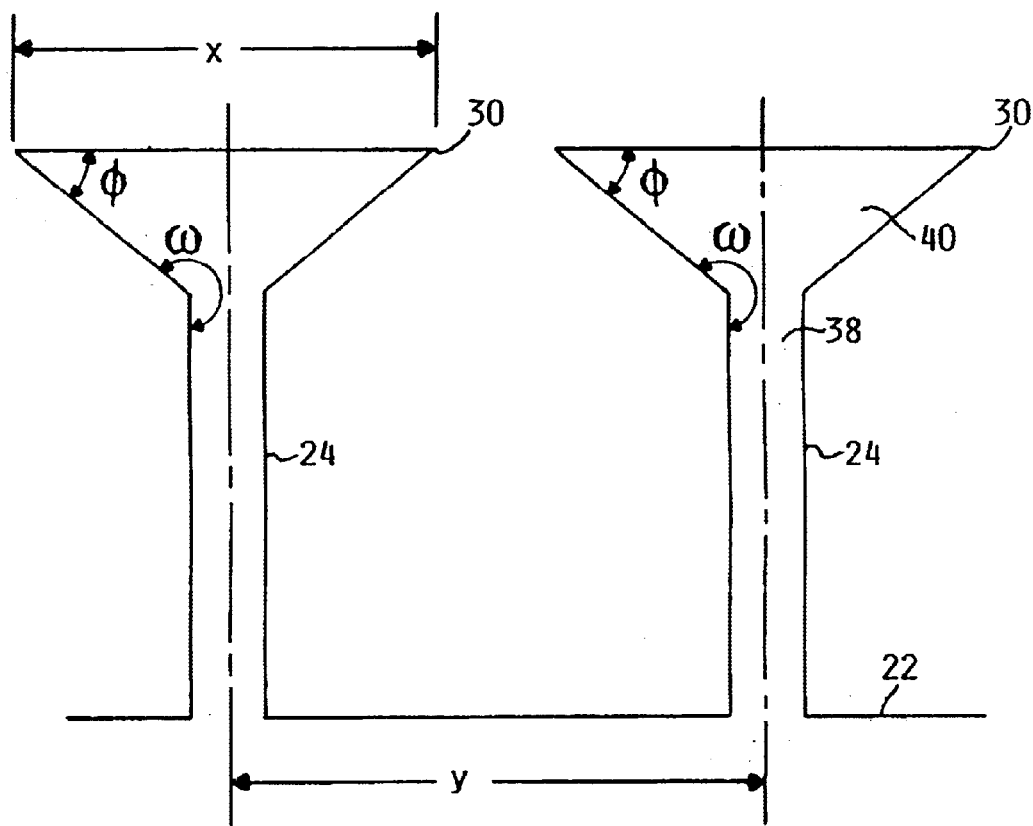
FIG. 14
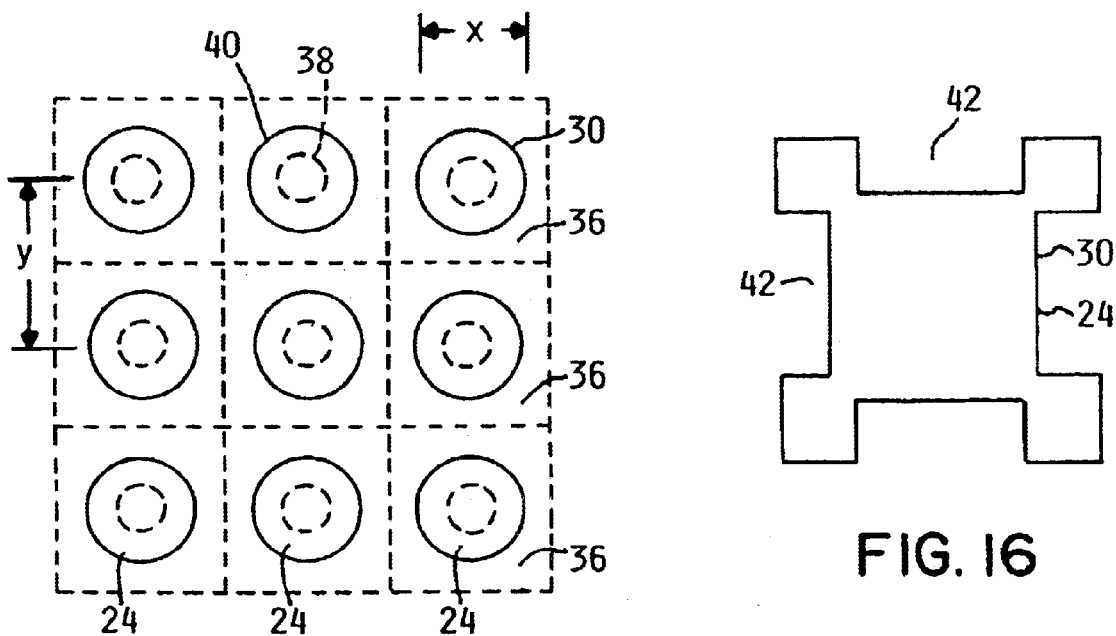
FIG. 15
FIG. 16

US 6,923,216 B2

MICROFLUIDIC DEVICE WITH ULTRAPHOBIC SURFACES

RELATED APPLICATIONS

This application claims the benefit of U.S. Provisional Patent Application Ser. No. 60/462,963, entitled "Ultraphobic Surface for High Pressure Liquids", filed Apr. 15, 2003, hereby fully incorporated herein by reference. This application U.S. patent application Ser. No. 10/454,742 entitled "Fluid Handling Component With Ultraphobic Surfaces", filed Jun. 3, 2003, also hereby fully incorporated herein by reference.

FIELD OF THE INVENTION

This invention relates generally to microfluidic devices, and more specifically to a microfluidic device having ultraphobic fluid contact surfaces.

BACKGROUND OF THE INVENTION

There has been much recent interest and effort directed to developing and using microfluidic devices. Microfluidic devices have already found useful application in printing devices and in so-called "lab-on-a-chip" devices, wherein complex chemical and biochemical reactions are carried out in microfluidic devices. The very small volumes of liquid needed for reactions in such a system enables increased reaction response time, low sample volume, and reduced reagent cost. It is anticipated that a myriad of further applications will become evident as the technology is refined and developed.

A significant factor in the design of a microfluidic device is the resistance to fluid movement imposed by contact of fluid with surfaces in the microscopic channels of the device. In order to overcome this resistance, higher fluid pressures are required within the device. In turn, fluid flow rates through the device may be limited by the amount of pressure that can be tolerated by the device or the process that the device supports. In addition, pressure losses through microscopic flow channels may vary greatly due to the characteristics of surfaces in the flow channel.

What is needed in the industry is a microfluidic device with fluid flow channels having predictable and optimal levels of resistance to fluid flow.

SUMMARY OF THE INVENTION

The invention substantially meets the needs of the industry for a microfluidic device having fluid flow channels with predictable and optimal levels of fluid flow resistance. In the invention, all or any portion of the fluid flow channels of any microfluidic device are provided with durable ultraphobic fluid contact surfaces. The ultraphobic surface generally includes a substrate portion with a multiplicity of projecting regularly shaped microscale or nanoscale asperities disposed in a regular array so that the surface has a predetermined contact line density measured in meters of contact line per square meter of surface area equal to or greater than a critical contact line density value "$\Lambda_L$" determined according to the formula:

$$\Lambda_L = \frac{-P}{\gamma \cos(\theta_{a,0} + \omega - 90°)},$$

where P is a predetermined maximum expected fluid pressure value within the fluid flow channel, $\gamma$ is the surface tension of the liquid, $\theta_{a,0}$ is the experimentally measured true advancing contact angle of the liquid on the asperity material in degrees, and $\omega$ is the asperity rise angle, and so that the ratio of the cross-sectional dimension of the asperities to the spacing dimension of the asperities is less than or equal to 0.1.

The asperities may be formed in or on the substrate material itself or in one or more layers of material disposed on the surface of the substrate. The asperities may be any regularly or irregularly shaped three dimensional solid or cavity and may be disposed in any regular geometric pattern.

The invention may also include process of making a microfluidic device including steps of forming at least one microscopic fluid flow channel in a body, the fluid flow channel having a fluid contact surface, and disposing a multiplicity of substantially uniformly shaped asperities in a substantially uniform pattern on the fluid contact surface. Each asperity may have a cross-sectional dimension and an asperity rise angle relative to the fluid contact surface. The asperities may be spaced apart by a substantially uniform spacing dimension and positioned so that the surface has a contact line density measured in meters of contact line per square meter of surface area equal to or greater than a critical contact line density value "$\Lambda_L$" determined according to the formula:

$$\Lambda_L = \frac{-P}{\gamma \cos(\theta_{a,0} + \omega - 90°)}$$

where P is a predetermined maximum expected fluid pressure value within the fluid flow channel, $\gamma$ is the surface tension of the liquid, $\theta_{a,0}$ is the experimentally measured true advancing contact angle of the liquid on the asperity material in degrees, and $\omega$ is the asperity rise angle. The ratio of the cross-sectional dimension of the asperities to the spacing dimension of the asperities is preferably less than or equal to 0.1 and most preferably less than or equal to 0.01.

The asperities may be formed using photolithography, or using nanomachining, microstamping, microcontact printing, self-assembling metal colloid monolayers, atomic force microscopy nanomachining, sol-gel molding, self-assembled monolayer directed patterning, chemical etching, sol-gel stamping, printing with colloidal inks, or by disposing a layer of carbon nanotubes on the substrate. The process may further include the step of determining a critical asperity height value "$Z_c$" in meters according to the formula:

$$Z_c = \frac{d(1 - \cos(\theta_{a,0} + \omega - 180°))}{2\sin(\theta_{a,0} + \omega - 180°)}$$

where d is the least distance in meters between adjacent asperities, $\theta_{a,0}$ is the true advancing contact angle of the liquid on the surface in degrees, and $\omega$ is the asperity rise angle in degrees.

It is anticipated that fluid flow channels in a microfluidic device having ultraphobic fluid contact surfaces will exhibit sharply reduced resistance to fluid flow, leading to greatly improved device efficiencies, lower intradevice pressures and improved fluid flow throughput. The ultraphobic surfaces will be durable, and capable of exhibiting predictable ultraphobic properties under fluid pressures up to the maximum design pressure.

BRIEF DESCRIPTION OF THE DRAWINGS

FIG. 1b is an exploded view of a microfluidic device according to the present invention;

FIG. 1c is a cross-sectional view of an alternative embodiment of a microfluidic device according to the present invention;

FIG. 4 is a partial top plan view of an alternative embodiment of an ultraphobic surface according to the present invention wherein the asperities are arranged in a hexagonal array;

FIG. 5 is a side elevation view of the alternative embodiment of FIG. 4;

FIG. 6 is a side elevation view depicting the deflection of liquid suspended between asperities;

FIG. 13 is a table listing formulas for contact line density and linear fraction of contact for a variety of asperity shapes and arrangements;

FIG. 14 is a side elevation view of an alternative embodiment of an ultraphobic surface according to the present invention;

FIG. 15 is a top plan view of the alternative embodiment of FIG. 14;

FIG. 16 is a top plan view of a single asperity in an alternative embodiment of an ultraphobic surface according to the present invention.

DETAILED DESCRIPTION OF THE INVENTION

Figure 1:
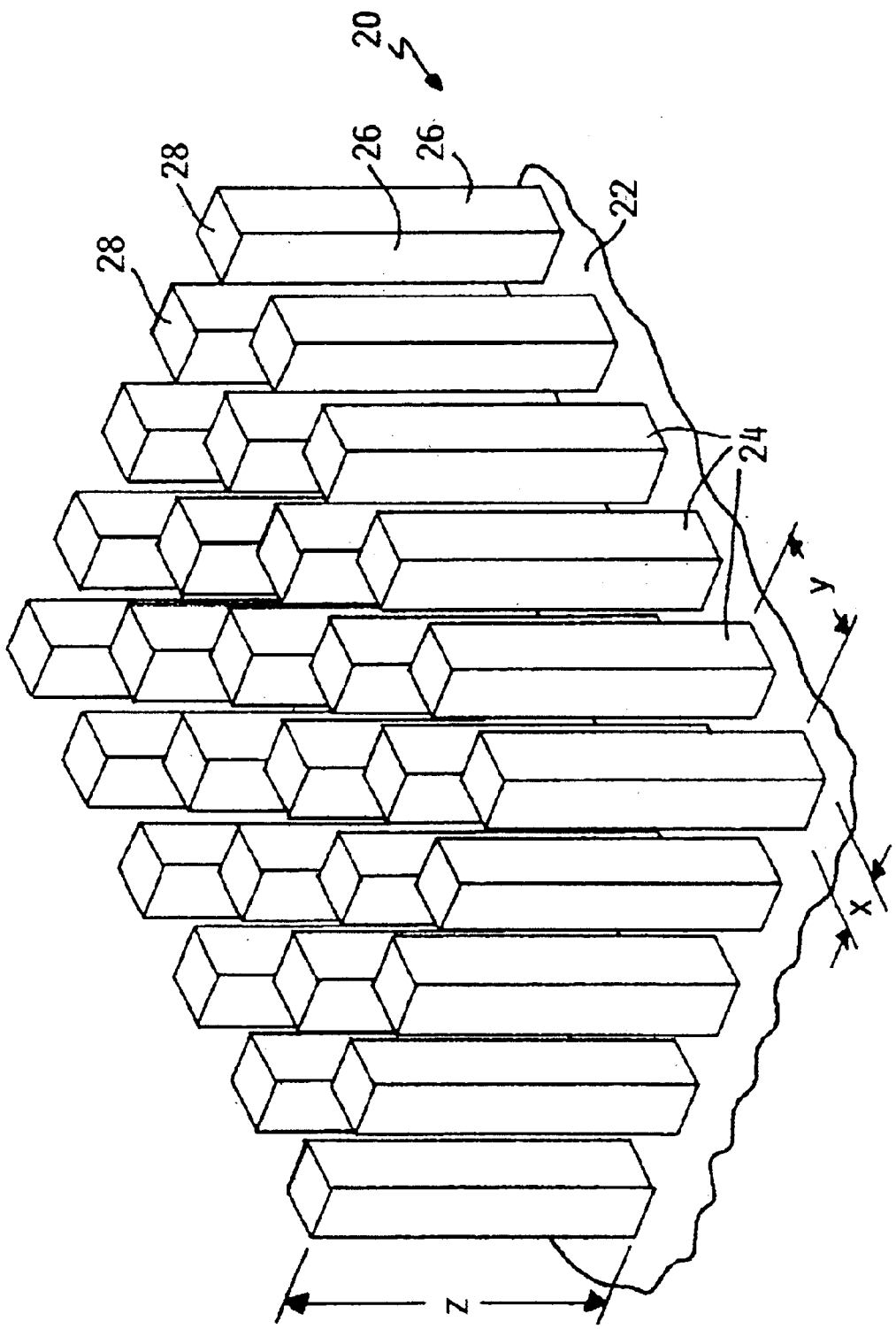
FIG. 1 is a perspective, greatly enlarged view of an ultraphobic surface according to the present invention.

For the purposes of the present application, the term "microfluidic device" refers broadly to any other device or component that may be used to contact, handle, transport, contain, process, or convey a fluid, wherein the fluid flows through one or more fluid flow channels of microscopic dimensions. For the purposes of the present application, "microscopic" means dimensions of 500 $\mu$m or less. "Fluid flow channel" broadly refers to any channel, conduit, pipe, tube, chamber, or other enclosed space of any cross-sectional shape used to handle, transport, contain, or convey a fluid. The term "fluid contact surface" refers broadly to any surface or portion thereof of a fluid flow channel that may be in contact with a fluid.

It is known that the physical characteristics of the fluid contact surfaces of fluid handling components have an effect on friction of the fluid with the components. Generally, for example, smoother surfaces reduce friction, while rougher surfaces increase friction. Also, surfaces made from materials resistant to wetting, such as PTFE or other engineered polymers, exhibit relatively lower fluid friction. Surfaces that are resistant to wetting by liquids are referred to as "phobic" surfaces. Such surfaces may be known as hydrophobic where the liquid is water, and lyophobic relative to other liquids. If a surface resists wetting to an extent that a small droplet of water or other liquid exhibits a very high stationary contact angle with the surface (greater than about 120 degrees), if the surface exhibits a markedly reduced propensity to retain liquid droplets, or if a liquid-gas-solid interface exists at the surface when completely submerged in liquid, the surface may be referred to as an "ultrahydrophobic" or "ultralyophobic" surface. For the purposes of this application, the term ultraphobic is used to refer generally to both ultrahydrophobic and ultralyophobic surfaces.

Friction between a liquid and a surface may be dramatically lower for an ultraphobic surface as opposed to a conventional surface. As a result, ultraphobic surfaces are extremely desirable for reducing resistance to fluid flow due to surface resistance forces, especially in microfluidic applications.

It is now well known that surface roughness has a significant effect on the degree of surface wetting. It has been generally observed that, under some circumstances, roughness can cause liquid to adhere more strongly to the surface than to a corresponding smooth surface. Under other circumstances, however, roughness may cause the liquid to adhere less strongly to the rough surface than the smooth surface. In some circumstances, the surface may be ultraphobic. Such an ultraphobic surface generally takes the form of a substrate member with a multiplicity of microscale to nanoscale projections or cavities, referred to herein as "asperities".

Generally, the pressure ($\Delta P_{total}$) for moving a liquid slug through a horizontal flow channel at a given velocity may be divided into components of viscous forces, surface forces, and gravity forces (head) so that:

$$\Delta P_{total} = \Delta P_{viscous} + \Delta P_{surface} + \Delta P_{gravity}. \quad (1)$$

Figure 1A:
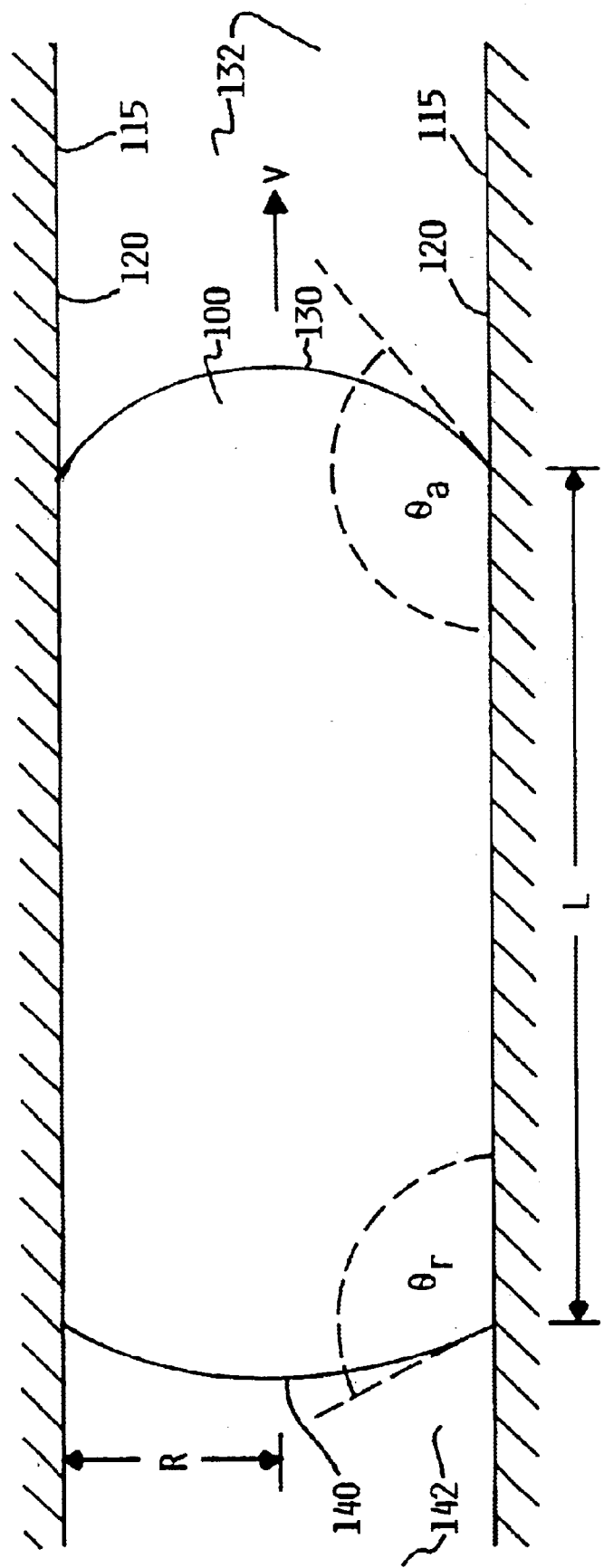
FIG. 1a is a schematic view of a liquid slug in a flow channel.

A horizontally oriented cylindrical flow channel 110 is depicted in cross-section in FIG. 1a. The cylindrical flow channel 110 is defined by a channel wall 115 having a fluid contact surface 120. A liquid slug 100 is depicted within flow channel 110. Liquid slug 100 has a forward interface 130 with fluid 132 and a rear interface 140 with fluid 142. It will be appreciated that fluid 132 and fluid 142 may be in gaseous or liquid form. For horizontally oriented cylindrical flow channel 110, the general relation given in equation (1) above may be more specifically expressed as:

$$\Delta P_{total} = \frac{8\mu L v}{R^2} + \frac{2\gamma(\cos\theta_r - \cos\theta_a)}{R}, \quad (2)$$

where $\mu$ is the viscosity of the liquid, L is the length of liquid slug 100, v is the velocity with which liquid slug 100 is moving, R is the cross-sectional radius of the cylindrical flow channel 110, γ is the surface tension of the liquid in liquid slug 100, $\theta_r$ is the actual receding contact angle of the rear interface 140 of liquid slug 100 with surface 120 of flow channel 110 and $\theta_a$ is the actual advancing contact angle of the forward interface 130 of liquid slug 100 with surface 120 of flow channel 110. Similar specific equations are described in the prior art for flow channels of non-cylindrical flow channels.

For a liquid slug 100 having one or more interfaces 130, 140, contacting surface 120 in a microscopic flow channel 110, surface forces will be dominant due to the miniscule dimensions of liquid slug 100. The viscous component of the forces may essentially be neglected. Thus, the pressure (ΔP) for moving liquid slug 100 through a horizontal microscopic cylindrical flow channel 110 effectively becomes:

$$\Delta P = \frac{2\gamma(\cos\theta_r - \cos\theta_a)}{R}. \tag{3}$$

By minimizing these surface forces through the use of ultraphobic flow channel surfaces according to the present invention, significant reductions in the pressure for moving a liquid slug through the flow channel may be achieved.

A microfluidic device 10 according to the present invention is depicted in a greatly enlarged, exploded view in FIG. 1b. Device 10 generally includes a body 11 with a rectangular flow channel 12 formed therein. Body 11 generally includes a main portion 13 and a cover portion 14. Flow channel 12 is defined on three sides by inwardly facing surfaces 15 on main portion 13 and on a fourth side by an inwardly facing surface 16 on cover portion 14. Surfaces 15 and surface 16 together define channel wall 16a. According to the present invention, all or any desired portion of channel wall 16a may be provided with an ultraphobic fluid contact surface 20. Although a two-piece configuration with rectangular flow channel is depicted in FIG. 1b, it will of course be readily appreciated that microfluidic device 10 may be formed in any other configuration and with virtually any other flow channel shape or configuration, including a one piece body 11 with a cylindrical, polygonal, or irregularly shaped flow channel formed therein.

An alternative embodiment of a microfluidic device is depicted in cross-section in FIG. 1c. In this embodiment, body 200 is formed in one integral piece. Cylindrical flow channel 202 is defined within body 200, and has a channel wall 204 presenting ultraphobic fluid contact surface 20 facing into flow channel 202.

A greatly enlarged view of ultraphobic fluid contact surface 20 according to the invention is depicted in FIG. 1. The surface 20 generally includes a substrate 22 with a multiplicity of projecting asperities 24. As further described herein, substrate 22 may be a portion of body 11 or may be a separate layer of material on body 11. Asperities 24 are typically formed from substrate 22 as also further described herein. Each asperity 24 has a plurality of sides 26 and a top 28. Each asperity 24 has a width dimension, annotated "x" in the figures, and a height dimension, annotated "z" in the figures.

Figure 3:
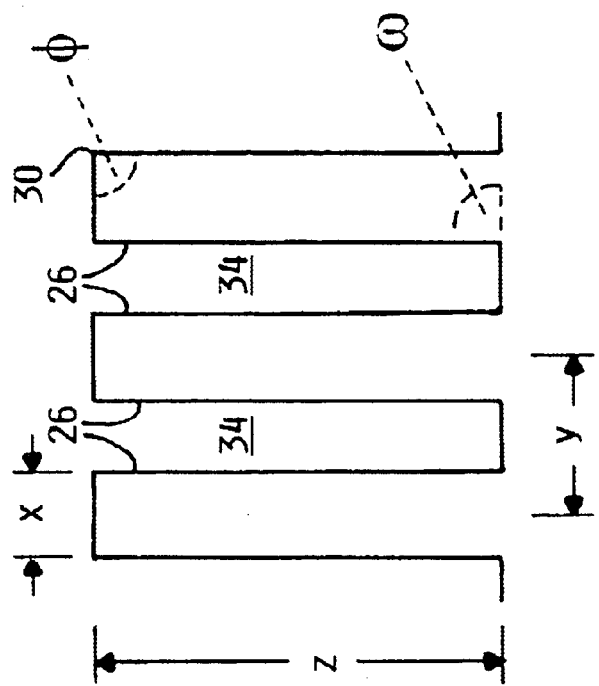
FIG. 3 is a side elevation view of the surface portion depicted in FIG. 2.
Figure 2:
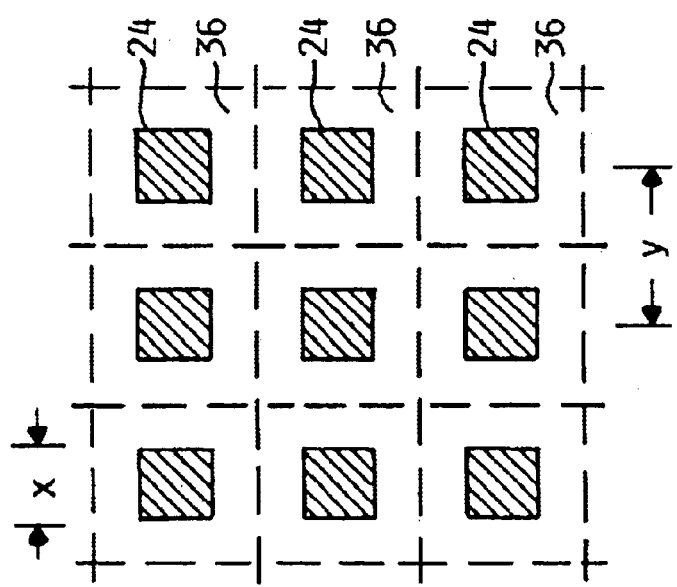
FIG. 2 is a top plan view of a portion of the surface of FIG. 1.

As depicted in FIGS. 1–3, asperities 24 are disposed in a regular rectangular array, each asperity spaced apart from the adjacent asperities by a spacing dimension, annotated "y" in the figures. The angle subtended by the top edge 30 of the asperities 24 is annotated φ, and the rise angle of the side 26 of the asperities 24 relative to the substrate 22 is annotated ω. The sum of the angles φ and ω is 180 degrees.

Figure 7:
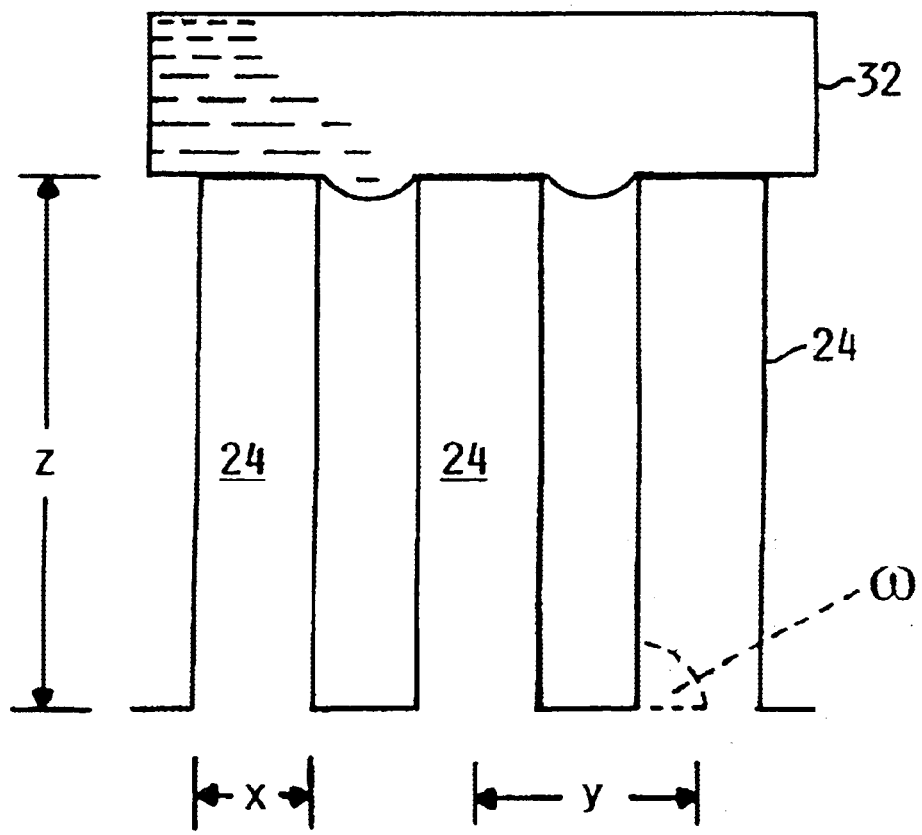
FIG. 7 is a side elevation view depicting a quantity of liquid suspended atop asperities.
Figure 8:
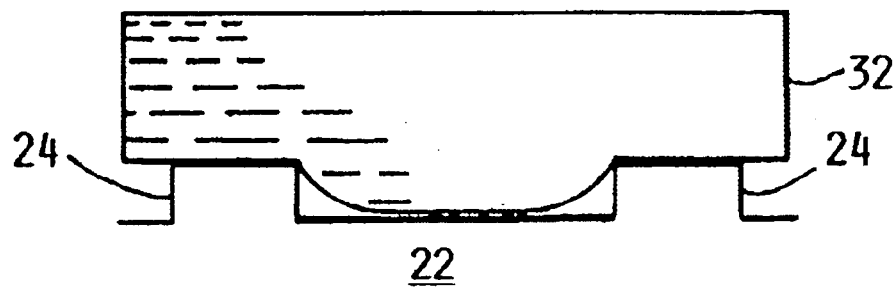
FIG. 8 is a side elevation view depicting the liquid contacting the bottom of the space between asperities.

Generally, ultraphobic fluid contact surface 20 will exhibit ultraphobic properties when a liquid-solid-gas interface is maintained at the surface. As depicted in FIG. 7, if liquid 32 contacts only the tops 28 and a portion of the sides 26 proximate top edge 30 of asperities 24, leaving a space 34 between the asperities filled with air or other gas, the requisite liquid-solid-gas interface is present. The liquid may be said to be "suspended" atop and between the top edges 30 of the asperities 24.

As will be disclosed hereinbelow, the formation of the liquid-solid-gas interface depends on certain interrelated geometrical parameters of the asperities 24 and the properties of the liquid, and the interaction of the liquid with the solid surface. According to the present invention, the geometrical properties of asperities 24 may be selected so that the surface 20 exhibits ultraphobic properties at any desired liquid pressure.

Referring to the rectangular array of FIGS. 1–3, surface 20 may be divided into uniform areas 36, depicted bounded by dashed lines, surrounding each asperity 24. The area density of asperities (δ) in each uniform area 36 may be described by the equation:

$$\delta = \frac{1}{y^2}, \tag{4}$$

where y is the spacing between asperities measured in meters.

For asperities 24 with a square cross-section as depicted in FIGS. 1–3, the length of perimeter (p) of top 28 at top edge 30:

$$p = 4x, \tag{5}$$

where x is the asperity width in meters.

Perimeter p may be referred to as a "contact line" defining the location of the liquid-solid-gas interface. The contact line density (Λ) of the surface, which is the length of contact line per unit area of the surface, is the product of the perimeter (p) and the area density of asperities (δ) so that:

$$\Lambda = p\delta. \tag{6}$$

For the rectangular array of square asperities depicted in FIGS. 1–3:

$$\Lambda = 4x/y^2. \tag{7}$$

A quantity of liquid will be suspended atop asperities 24 if the body forces (F) due to gravity acting on the liquid are less than surface forces (f) acting at the contact line with the asperities. Body forces (F) associated with gravity may be determined according to the following formula:

$$F = \rho g h, \tag{8}$$

where (ρ) is the density of the liquid, (g) is the acceleration due to gravity, and (h) is the depth of the liquid. Thus, for example, for a 10 meter column of water having an approximate density of 1000 kg/m³, the body forces (F) would be:

$$F = (1000 \text{ kg/m}^3)(9.8 \text{ m/s}^2)(10 \text{ mn}) = 9.8 \times 10^4 \text{ kg/m}^2\text{-s}.$$

Surface forces (f) depend on the surface tension of the liquid (γ), its apparent contact angle with the side 26 of the asperities 24 with respect to the vertical $\theta_s$, the contact line density of the asperities (Λ) and the apparent contact area of the liquid (A):

$$f = -\Lambda A \gamma \cos\theta_s. \tag{9}$$

The true advancing contact angle ($\theta_{a,0}$) of a liquid on a given solid material is defined as the largest experimentally measured stationary contact angle of the liquid on a surface of the material having essentially no asperities. The true advancing contact angle is readily measurable by techniques well known in the art.

Suspended drops on a surface with asperities exhibit their true advancing contact angle value ($\theta_{a,0}$) at the sides of the asperities. The contact angle with respect to the vertical at the side of the asperities ($\theta_s$) is related to the true advancing contact angle ($\theta_{a,0}$) by $\phi$ or $\omega$ as follows:

$$\theta_s = \theta_{a,0} + 90° - \phi = \theta_{a,0} + \omega - 90°. \tag{10}$$

By equating F and f and solving for contact line density $\Lambda$, a critical contact line density parameter $\Lambda_L$ may be determined for predicting ultraphobic properties in a surface:

$$\Lambda_L = \frac{-\rho g h}{\gamma \cos(\theta_{a,0} + \omega - 90°)}, \tag{11}$$

where g is the density ($\rho$) of the liquid, (g) is the acceleration due to gravity, (h) is the depth of the liquid, the surface tension of the liquid ($\gamma$), $\omega$ is the rise angle of the side of the asperities relative to the substrate in degrees, and ($\theta_{a,0}$) is the experimentally measured true advancing contact angle of the liquid on the asperity material in degrees.

If $\Lambda > \Lambda_L$, the liquid will be suspended atop the asperities 24, producing an ultraphobic surface. Otherwise, if $\Lambda < \Lambda_L$, the liquid will collapse over the asperities and the contact interface at the surface will be solely liquid/solid, without ultraphobic properties.

It will be appreciated that by substituting an appropriate value in the numerator of the equation given above, a value of critical contact line density may be determined to design a surface that will retain ultraphobic properties at any desired amount of pressure. The equation may be generalized as:

$$\Lambda_L = \frac{-P}{\gamma \cos(\theta_{a,0} + \omega - 90°)}, \tag{12}$$

where P is the maximum pressure under which the surface must exhibit ultraphobic properties in kilograms per square meter, $\gamma$ is the surface tension of the liquid in Newtons per meter, $\theta_{a,0}$ is the experimentally measured true advancing contact angle of the liquid on the asperity material in degrees, and $\omega$ is the asperity rise angle in degrees.

It is generally anticipated that a surface 20 formed according to the above relations will exhibit ultraphobic properties under any liquid pressure values up to and including the value of P used in equation (12) above. The ultraphobic properties will be exhibited whether the surface is submerged, subjected to a jet or spray of liquid, or impacted with individual droplets.

Once the value of critical contact line density is determined, the remaining details of the geometry of the asperities may be determined according to the relationship of x and y given in the equation for contact line density. In other words, the geometry of the surface may be determined by choosing the value of either x or y in the contact line equation and solving for the other variable.

The tendency of the ultraphobic surface 20 to repel droplets of liquid so that the droplets rest on the surface at very high contact angles, may be best expressed in terms of contact angle hysteresis ($\Delta\theta$), which is the difference between the advancing and receding contact angles for a liquid droplet on the surface. Generally, lower values of contact angle hysteresis correspond to a relatively greater repellency characteristic of the surface. Contact angle hysteresis for a surface may be determined according to the following equation:

$$\Delta\theta = \lambda_p(\Delta\theta_0 + \omega), \tag{13}$$

where ($\lambda_p$) is the linear fraction of contact along the asperities, ($\Delta\theta_0$) is the difference between the true advancing contact angle ($\theta_{a,0}$) and the true receding contact angle ($\theta_{r,0}$) for the surface material, and ($\omega$) is the rise angle of the asperities. For a rectangular array of square asperities:

$$\lambda_p = x/y. \tag{14}$$

Equations for determining for surfaces having other geometries are given in FIG. 13. For droplets of liquid on the surface, the actual advancing contact angle of the surface may be determined according to the equation:

$$\theta_a = \lambda_p(\theta_{a,0} + \omega) + (1 - \lambda_p)\theta_{air}, \tag{15}$$

and the actual receding contact angle may be determined according to the equation:

$$\theta_r = \lambda_p \theta_{r,0} + (1 - \lambda_p)\theta_{air}. \tag{16}$$

It will be readily appreciated by examining the relations given hereinabove that relatively lower values of $\lambda_p$, $\omega$, x/y, and $\Lambda$ lead to relatively improved repellency for the surface, and that relatively higher values of each of these same parameters lead to relatively improved ability of the surface to suspend a column of liquid. As a result, it will generally be necessary to strike a balance in selecting values for these parameters if a surface with good repellency and suspension characteristics is desired.

Figure 17:
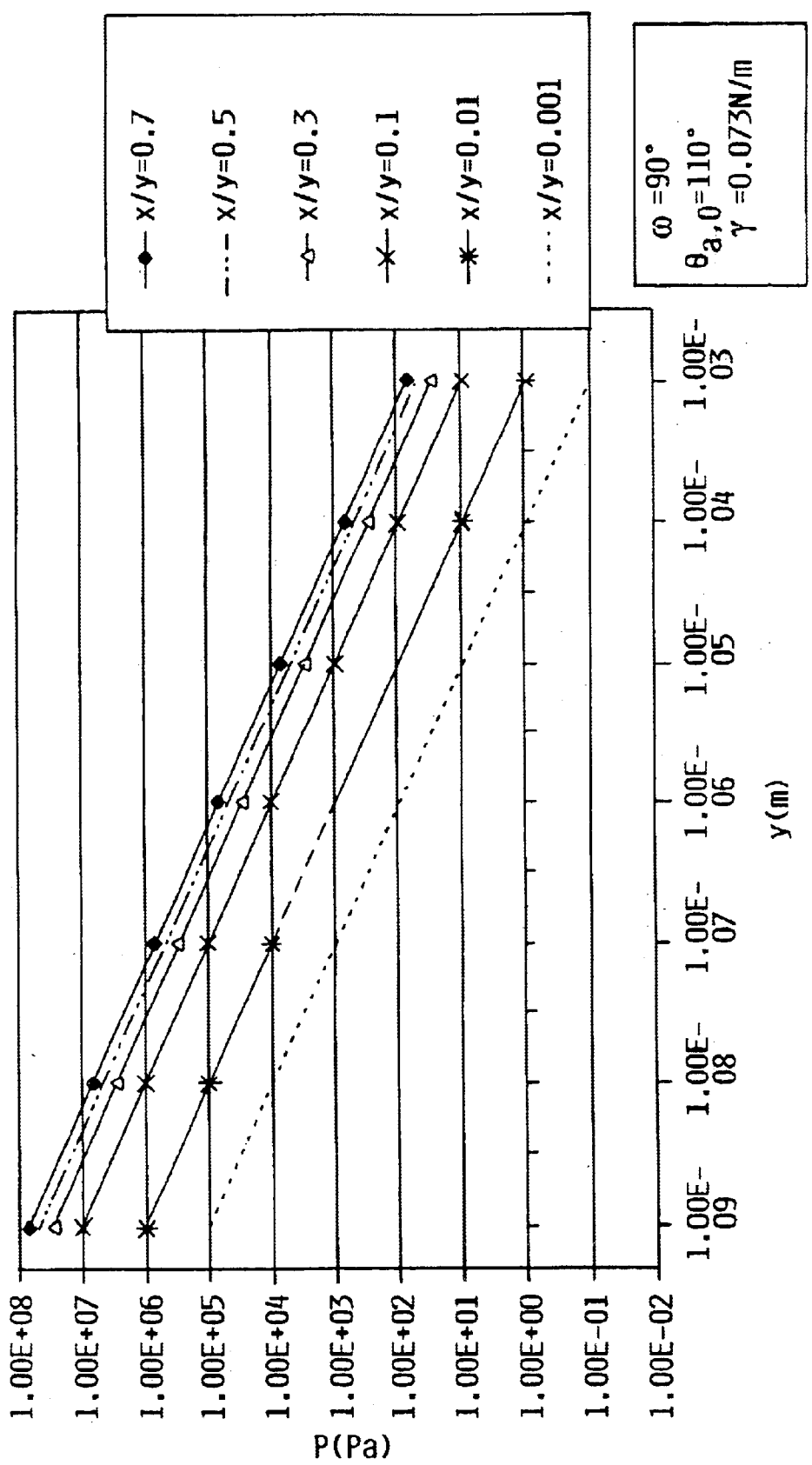
FIG. 17 is a graphical representation for a specific ultraphobic surface and liquid of the relationship between asperity spacing ($\gamma$) and maximum pressure (P) for various values of the x/y ratio.

The above equations may also be used to plot the relationship for given liquid properties between asperity spacing (y) and maximum pressure (P) for various values of x/y. Such plots, an example of which is depicted in FIG. 17, may serve as useful design tools as is demonstrated in the example given hereinbelow.

The liquid interface deflects downwardly between adjacent asperities by an amount $D_1$ as depicted in FIG. 6. If the amount $D_1$ is greater than the height (z) of the asperities 24, the liquid will contact the substrate 22 at a point between the asperities 24. If this occurs, the liquid will be drawn into space 34, and collapse over the asperities, destroying the ultraphobic character of the surface. The value of $D_1$ represents a critical asperity height ($Z_c$), and is determinable according to the following formula:

$$D_1 = Z_c = \frac{d(1 - \cos(\theta_{a,0} + \omega - 180°))}{2\sin(\theta_{a,0} + \omega - 180°)}, \tag{17}$$

where (d) is the least distance between adjacent asperities at the contact line, $\omega$ is the asperity rise angle, and $\theta_{a,0}$ is the experimentally measured true advancing contact angle of the liquid on the asperity material. The height (z) of asperities 24 must be at least equal to, and is preferably greater than, critical asperity height ($Z_c$).

Figure 9:
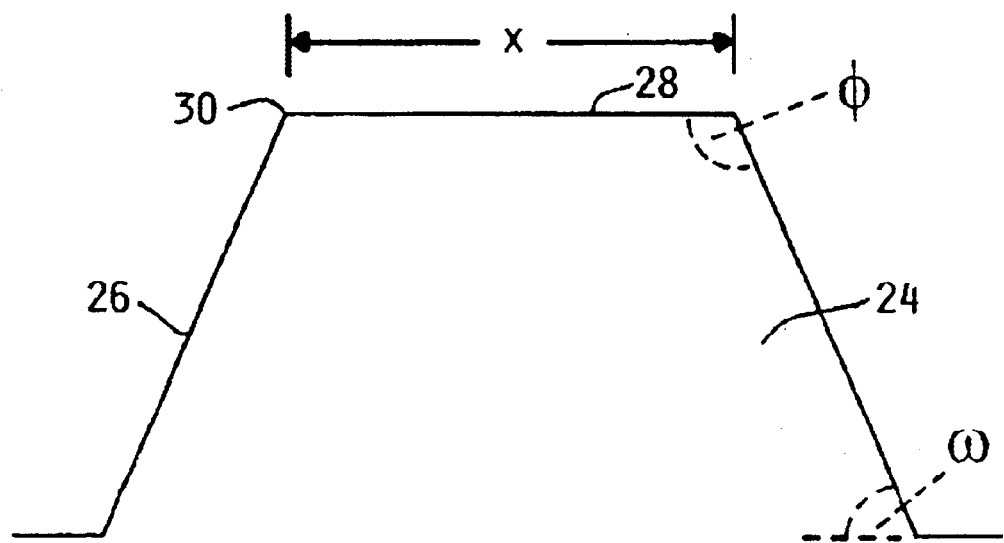
FIG. 9 is a side elevation view of a single asperity in an alternative embodiment of an ultraphobic surface according to the present invention wherein the asperity rise angle is an acute angle.
Figure 10:
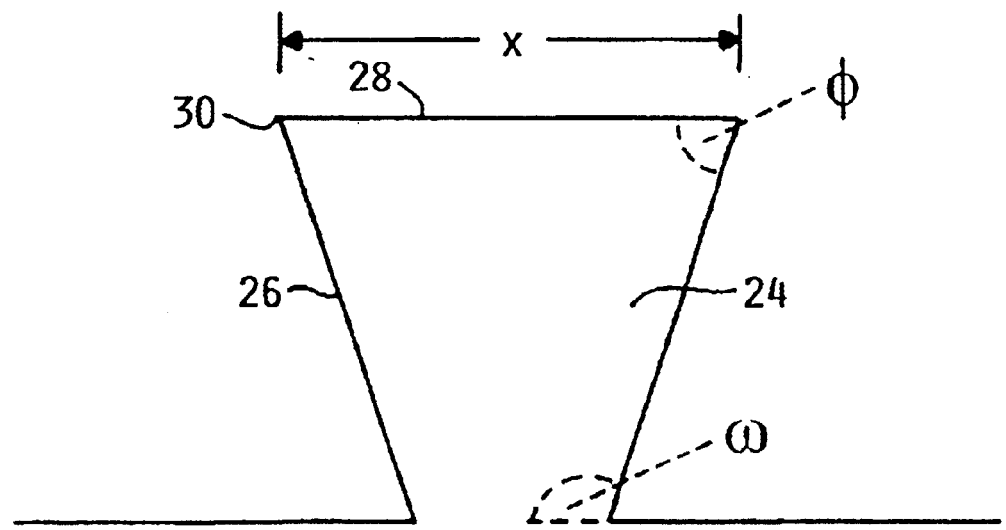
FIG. 10 is a side elevation view of a single asperity in an alternative embodiment of an ultraphobic surface according to the present invention wherein the asperity rise angle is an obtuse angle.

Although in FIGS. 1–3 the asperity rise angle $\omega$ is 90 degrees, other asperity geometries are possible. For example, $\omega$ may be an acute angle as depicted in FIG. 9 or an obtuse angle as depicted in FIG. 10. Generally, it is preferred that $\omega$ be between 80 and 130 degrees.

Figure 11:
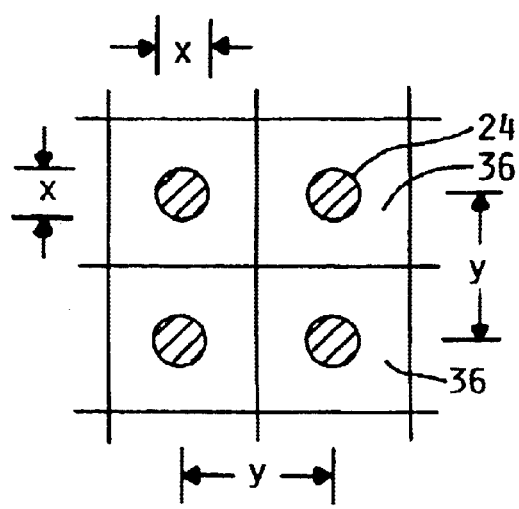
FIG. 11 a partial top plan view of an alternative embodiment of an ultraphobic surface according to the present invention wherein the asperities are cylindrical and are arranged in a rectangular array.
Figure 12:
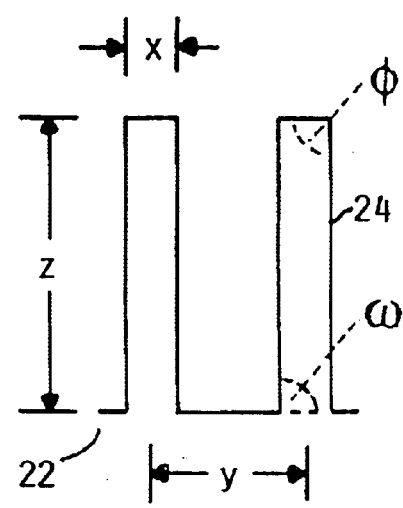
FIG. 12 is a side elevation view of the alternative embodiment of FIG. 11.

It will also be appreciated that a wide variety of asperity shapes and arrangements are possible within the scope of the present invention. For example, asperities may be polyhedral, cylindrical as depicted in FIGS. 11–12, cylindroid, or any other suitable three dimensional shape. In addition, various strategies may be utilized to optimize contact line density of the asperities. As depicted in FIGS. 14 and 15, the asperities 24 may be formed with a base portion 38 and a head portion 40. The larger perimeter of head portion 40 at top edge 30 increases the contact line density of the surface. Also, features such as recesses 42 may be formed in the asperities 24 as depicted in FIG. 16 to increase the perimeter at top edge 30, thereby increasing contact line density. The asperities may also be cavities formed in the substrate.

The asperities may be arranged in a rectangular array as discussed above, in a polygonal array such as the hexagonal array depicted in FIGS. 4–5, or a circular or ovoid arrangement. The asperities may also be randomly distributed so long as the critical contact line density is maintained, although such a random arrangement may have less predictable ultraphobic properties, and is therefore less preferred. In such a random arrangement of asperities, the critical contact line density and other relevant parameters may be conceptualized as averages for the surface. In the table of FIG. 13, formulas for calculating contact line densities for various other asperity shapes and arrangements are listed.

Generally, the substrate material may be any material upon which micro or nano scale asperities may be suitably formed. The asperities may be formed directly in the substrate material itself, or in one or more layers of other material deposited on the substrate material, by photolithography or any of a variety of suitable methods. Direct extrusion may be used to form asperities in the form of parallel ridges. Such parallel ridges are most desirably oriented transverse to the direction fluid flow. A photolithography method that may be suitable for forming micro/nanoscale asperities is disclosed in PCT Patent Application Publication WO 02/084340, hereby fully incorporated herein by reference.

Other methods that may be suitable for forming asperities of the desired shape and spacing include nanomachining as disclosed in U.S. Patent Application Publication No. 2002/00334879, microstamping as disclosed in U.S. Pat. No. 5,725,788, microcontact printing as disclosed in U.S. Pat. No. 5,900,160, self-assembled metal colloid monolayers, as disclosed in U.S. Pat. No. 5,609,907, microstamping as disclosed in U.S. Pat. No. 6,444,254, atomic force microscopy nanomachining as disclosed in U.S. Pat. No. 5,252,835, nanomachining as disclosed in U.S. Pat. No. 6,403,388, sol-gel molding as disclosed in U.S. Pat. No. 6,530,554, self-assembled monolayer directed patterning of surfaces, as disclosed in U.S. Pat. No. 6,518,168, chemical etching as disclosed in U.S. Pat. No. 6,541,389, or soi-gel stamping as disclosed in U.S. Patent Application Publication No. 2003/0047822, all of which are hereby fully incorporated herein by reference. Carbon nanotube structures may also be usable to form the desired asperity geometries. Examples of carbon nanotube structures are disclosed in U.S. Patent Application Publication Nos. 2002/0098135 and 2002/0136683, also hereby fully incorporated herein by reference. Also, suitable asperity structures may be formed using known methods of printing with colloidal inks. Of course, it will be appreciated that any other method by which micro/nanoscale asperities may be accurately formed may also be used.

Generally, it is most desirable to optimize the repellency characteristics of the ultraphobic flow channel surfaces in order to minimize contact of the liquid slug with the flow channel surfaces, thereby also minimizing the resulting surface forces. As explained hereinabove, repellency characteristics of the surface may be optimized by selecting relatively lower values for $\lambda_p$, $\omega$, x/y, or $\Lambda$, while still ensuring that the surface has a sufficient critical contact line density value ($\Lambda_L$) to ensure that the surface has ultraphobic properties at the maximum pressure expected to be encountered in the flow channel. For best flow channel performance, the x/y ratio for the asperity geometry should be less than about 0.1 and most preferably about 0.01.

A method of optimizing a microscopic flow channel for repellency characteristics may be illustrated by the following examples:

EXAMPLE 1

A cylindrical microscopic flow channel is to be formed in a silicon body to produce a microfluidic device. An ultraphobic surface is to be provided on the inwardly facing walls of the microscopic flow channel according to the present invention. The ultraphobic surface will consist of an array of square posts ($\omega=90°$) disposed on the walls of the channel. The channel walls will also be coated with organosilane so that the channel has the following dimensions and characteristics:

$R=1\ \mu m$ $\theta_{a,0}=110°$ $\theta_{r,0}=90°$

A water slug in the flow channel has the following dimensions and characteristics:

$\gamma=0.073\ N/m$ $L=0.1\ mm$ $v=0.1\ mm/s$

If the flow channel has smooth fluid contact surfaces so that the actual advancing and receding contact angles of the slug ($\theta_a$, $\theta_r$) are substantially equal to the true advancing and receding contact angles for the fluid contact surface material, the pressure required to move the liquid slug through the smooth flow channel may be calculated as:

$$\Delta P = \frac{2\gamma(\cos\theta_r - \cos\theta_a)}{R} = \frac{2(0.073)(\cos 90 - \cos 110)}{0.000001} \approx 5 \times 10^4 Pa$$

Repellancy of the fluid contact surface is optimized by selecting a small x/y ratio so as to increase the actual advancing and receding contact angles of the water at the fluid contact surface:

Select $x/y=\lambda_p=0.01$

So that:

$\theta_a=\lambda_p(\theta_{a,0}+\omega)+(1-\lambda_p)\theta_{air}=180°$ and:

$\theta_r=\lambda_p\theta_{r,0}+(1-\lambda_p)\theta_{air}=179°$

The pressure for moving the liquid slug through the flow channel having ultraphobic fluid contact surfaces becomes:

$$\Delta P = \frac{2\gamma(\cos\theta_r - \cos\theta_a)}{R} = \frac{2(0.073)(\cos 179 - \cos 180)}{0.0000001} \approx 1 \times 10^2 Pa$$

The remaining geometric details of the surface may then be determined as follows using the relations given above:

$$\Lambda_L = \frac{-\Delta P}{\gamma\cos(\theta_{a,0} + \omega - 90°)} = \frac{-100}{0.073\cos(110 + 90 - 90)} \approx 4000 \, m^{-1}$$

Referring to FIG. 17, which is a plot of the relationship between asperity spacing (y) and maximum pressure (P) for various values of x/y, with water as the liquid and with values of $\theta_{a,0}$ and $\theta_{r,0}$ consistent with the organosilane coated silicon material, it may be determined that y should be about $1\times 10^{-5}$ m or 10 μm for a maximum pressure of 100 Pa and an x/y ratio of 0.01. Accordingly:

$x=0.01(y)=0.01(1\times 10^{-5}\text{ m})=1\times 10^{-7}$ m or 100 nm

Next, solving for $Z_c$:

$$Z_c = \frac{d(1 - \cos(\theta_{a,0} + \omega - 180°))}{2\sin(\theta_{a,0} + \omega - 180°)} =$$

$$\frac{(10\mu m - 0.1\mu m)((1 - \cos(110° + 90° - 180°))}{2\sin(110° + 90° - 180°)} \approx 0.9\mu m$$

Thus, if the square asperities are placed on the fluid contact surfaces in the flow channel in a rectangular array, they should have a cross-sectional dimension of about 100 nm, should be spaced at about 10 μm apart and should be at least 0.9 μm in height.

EXAMPLE 2

Assume a cylindrical microscopic flow channel in PFA plastic having the following dimensions and characteristics:

R=10 μm $\theta_{a,0}$=110°

$\theta_{r,0}$=90°

Assume also a water slug in the flow channel:

γ=0.073 N/m

L=1 mm v=0.1 mm/s

Again, if the flow channel has smooth fluid contact surfaces so that the actual advancing and receding contact angles of the slug ($\theta_a$, $\theta_r$) are substantially equal to the true advancing and receding contact angles for the fluid contact surface material, the pressure required to move the liquid slug through the smooth flow channel may be calculated as:

$$\Delta P = \frac{2\gamma(\cos\theta_r - \cos\theta_a)}{R} = \frac{2(0.073)(\cos 90 - \cos 110)}{0.000010} \approx 5 \times 10^3 Pa$$

An array of square posts (ω=90°) is to be disposed on the fluid contact surface of the flow channel so as to form an ultraphobic surface.

Select $x/y = \lambda_p = 0.1$

So that:

$\theta_{a1} = \lambda_p(\theta_{a,0}+\omega)+(1-\lambda_p)\theta_{air}=180°$ and:

$\theta_r = \lambda_p\theta_{r,0}+(1-\lambda_p)\theta_{air}=171°$

The pressure for moving the liquid slug through the flow channel having ultraphobic fluid contact surfaces becomes:

$$\Delta P = \frac{2\gamma(\cos\theta_r - \cos\theta_a)}{R} = \frac{2(0.073)(\cos 171 - \cos 180)}{0.000010} \approx 180 Pa$$

The remaining geometric details of the surface may then be determined as follows using the relations given above:

$$\Lambda_L = \frac{-\Delta P}{\gamma\cos(\theta_{a,0} + \omega - 90°)} = \frac{-180 Pa}{0.073\cos(110 + 90 - 90)} \approx 7200$$

Referring to FIG. 17, which is a plot of the relationship between asperity spacing (y) and maximum pressure (P) for various values of x/y, with water as the liquid and with values of $\theta_{a,0}$ and $\theta_{r,0}$ consistent with PFA material, it may be determined that y should be about $1\times 10^{-5}$ m or 10 μm for a maximum pressure of 100 Pa and an x/y ratio of 0.01. Accordingly:

$x=0.1(y)=0.1(10\ \mu m)=1\ \mu m$

Next, solving for $Z_c$:

$$Z_c = \frac{d(1 - \cos(\theta_{a,0} + \omega - 180°))}{2\sin(\theta_{a,0} + \omega - 180°)} =$$

$$\frac{(10\mu m - 0.1\mu m)((1 - \cos(110° + 90° - 180°))}{2\sin(110° + 90° - 180°)} \approx 0.8\mu m$$

Thus, if the square asperities are placed on the fluid contact surfaces in the flow channel in a rectangular array, they should have a cross-sectional dimension of about 1 μm, should be spaced at about 10 μm apart and should be at least 0.8 μm in height.

It will be readily appreciated by those of skill in the art that the above disclosed method may be used to determine the optimal asperity spacing and geometry for an ultraphobic fluid contact surface in a microscopic flow channel for any desired liquid and flow channel surface material.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

What is claimed is:

1. A microfluidic device comprising:
a body having at least one microscopic fluid flow channel therein, the microscopic fluid flow channel being defined by a channel wall having a fluid contact surface portion, said fluid contact surface portion comprising a substrate with a multiplicity of substantially uniformly shaped and dimensioned asperities thereon, said asperities arranged in a substantially uniform pattern, each asperity having a cross-sectional dimension and an asperity rise angle relative to the substrate, the asperities spaced apart by a substantially uniform spacing dimension and positioned so that the surface has a contact line density measured in meters of contact line per square meter of surface area equal to or greater than a critical contact line density value "$\Lambda_L$" determined according to the formula:

$$\Lambda_L = \frac{-P}{\gamma \cos(\theta_{a,0} + \omega - 90°)}$$

where P is a predetermined maximum expected fluid pressure value within the fluid flow channel, $\gamma$ is the surface tension of the liquid, $\theta_{a,0}$ is the experimentally measured true advancing contact angle of the liquid on the asperity material in degrees, and $\omega$ is the asperity rise angle; and wherein the ratio of the cross-sectional dimension of the asperities to the spacing dimension of the asperities is less than or equal to 0.1.

2. The device of claim 1, wherein the asperities are projections.

3. The device of claim 2, wherein the asperities are polyhedrally shaped.

4. The device of claim 2, wherein each asperity has a generally square cross-section.

5. The device of claim 2, wherein the asperities are cylindrical or cylindroidally shaped.

6. The device of claim 1, wherein the asperities are cavities formed in the substrate.

7. The device of claim 1, wherein the asperities are parallel ridges.

8. The device of claim 7, wherein the parallel ridges are disposed transverse to the direction of fluid flow.

9. The device of claim 1, wherein the asperities have a substantially uniform asperity height relative to the substrate portion, and wherein the asperity height is greater than a critical asperity height value "$Z_c$" in meters determined according to the formula:

$$Z_c = \frac{d(1 - \cos(\theta_{a,0} + \omega - 180°))}{2\sin(\theta_{a,0} + \omega - 180°)}$$

where d is the least distance in meters between adjacent asperities, $\theta_{a,0}$ is the experimentally measured true advancing contact angle of the liquid on the asperity material in degrees, and $\omega$ is the asperity rise angle in degrees.

10. A process of making a microfluidic device comprising steps of:
forming at least one microscopic fluid flow channel in a body, the fluid flow channel being defined by a channel wall having a fluid contact surface portion; and
disposing a multiplicity of substantially uniformly shaped asperities in a substantially uniform pattern on the fluid contact surface portion, each asperity having a cross-sectional dimension and an asperity rise angle relative to the fluid contact surface, the asperities spaced apart by a substantially uniform spacing dimension and positioned so that the surface has a contact line density measured in meters of contact line per square meter of surface area equal to or greater than a critical contact line density value "$\Lambda_L$" determined according to the formula:

$$\Lambda_L = \frac{-P}{\gamma \cos(\theta_{a,0} + \omega - 90°)}$$

where P is a predetermined maximum expected fluid pressure value within the fluid flow channel, $\gamma$ is the surface tension of the liquid, $\theta_{a,0}$ is the experimentally measured true advancing contact angle of the liquid on the asperity material in degrees, and $\omega$ is the asperity rise angle; and wherein the ratio of the cross-sectional dimension of the asperities to the spacing dimension of the asperities is less than or equal to 0.1.

11. The process of claim 10, wherein the ratio of the cross-sectional dimension of the asperities to the spacing dimension of the asperities is less than or equal to 0.01.

12. The process of claim 10, wherein the asperities are formed by a process selected from the group consisting of nanomachining, microstamping, microcontact printing, self-assembling metal colloid monolayers, atomic force microscopy nanomachining, sol-gel molding, self-assembled monolayer directed patterning, chemical etching, sol-gel stamping, printing with colloidal inks, and disposing a layer of carbon nanotubes on the surface.

13. The process of claim 10, wherein the asperities are formed by extrusion.

14. The process of claim 10, further comprising the step of selecting a geometrical shape for the asperities.

15. The process of claim 10, further comprising the step of selecting an array pattern for the asperities.

16. The process of claim 10, further comprising the steps of selecting at least one dimension for the asperities and determining at least one other dimension for the asperities using an equation for contact line density.

17. The process of claim 10, further comprising the step of determining a critical asperity height value "$Z_c$" in meters according to the formula:

$$Z_c = \frac{d(1 - \cos(\theta_{a,0} + \omega - 180°))}{2\sin(\theta_{a,0} + \omega - 180°)}$$

where d is the least distance in meters between adjacent asperities, $\theta_{a,0}$ is the true advancing contact angle of the liquid on the surface in degrees, and $\omega$ is the asperity rise angle in degrees.

18. A microfludic fluid flow system including at least one microfluidic device, the device comprising:
a body having at least one microscopic fluid flow channel therein, the microscopic fluid flow channel being defined by a channel wall having a fluid contact surface portion, said fluid contact surface portion comprising a substrate with a multiplicity of substantially uniformly shaped and dimensioned asperities thereon, said asperities arranged in a substantially uniform pattern, each asperity having a cross-sectional dimension and an asperity rise angle relative to the substrate, the asperities spaced apart by a substantially uniform spacing dimension and positioned so that the fluid contact surface portion has a contact line density measured in meters of contact line per square meter of surface area equal to or greater than a critical contact line density value "$\Lambda_L$" determined according to the formula:

$$\Lambda_L = \frac{-P}{\gamma \cos(\theta_{a,0} + \omega - 90°)}$$

where P is a predetermined maximum expected fluid pressure value within the fluid flow channel, $\gamma$ is the surface tension of the liquid, $\theta_{a,0}$ is the experimentally measured true advancing contact angle of the liquid on the asperity material in degrees, and $\omega$ is the asperity rise angle; and wherein the ratio of the cross-sectional dimension of the asperities to the spacing dimension of the asperities is less than or equal to 0.1.

19. The system of claim 18, wherein the asperities are projections.

20. The system of claim 19, wherein the asperities are polyhedrally shaped.

21. The system of claim 19, wherein each asperity has a generally square cross-section.

22. The system of claim 19, wherein the asperities are cylindrical or cylindroidally shaped.

23. The device of claim 18, wherein the asperities are cavities formed in the substrate.

24. The device of claim 18, wherein the asperities are parallel ridges.

25. The device of claim 24, wherein the parallel ridges are disposed transverse to the direction of fluid flow.

26. The device of claim 18, wherein the asperities have a substantially uniform asperity height relative to the substrate portion, and wherein the asperity height is greater than a critical asperity height value "$Z_c$" in meters determined according to the formula:

$$Z_c = \frac{d(1 - \cos(\theta_{a,0} + \omega - 180°))}{2\sin(\theta_{a,0} + \omega - 180°)}$$

where d is the least distance in meters between adjacent asperities, $\theta_{a,0}$ is the experimentally measured true advancing contact angle of the liquid on the asperity material in degrees, and $\omega$ is the asperity rise angle in degrees.

* * * * *